US007637989B2

(12) United States Patent
Bong

(10) Patent No.: US 7,637,989 B2
(45) Date of Patent: Dec. 29, 2009

(54) RAPID CYCLE PRESSURE SWING ADSORPTION OXYGEN CONCENTRATION METHOD AND MECHANICAL VALVE FOR THE SAME

(75) Inventor: Cheng Chen Bong, Kowloon (HK)

(73) Assignee: Merits Health Products Co., Ltd., Taichung (TW)

(*) Notice: Subject to any disclaimer, the term of this patent is extended or adjusted under 35 U.S.C. 154(b) by 0 days.

(21) Appl. No.: 10/748,291

(22) Filed: Dec. 31, 2003

(65) Prior Publication Data

US 2005/0139070 A1 Jun. 30, 2005

(51) Int. Cl.
*B01D 53/02* (2006.01)

(52) U.S. Cl. ...................... 96/130; 96/143; 128/205.12; 128/205.27

(58) Field of Classification Search ............ 95/96–106, 95/130; 96/109–116, 130, 143, 144, 154; 128/204.48, 205.11, 205.12, 205.27, 207.14, 128/207.18

See application file for complete search history.

(56) References Cited

U.S. PATENT DOCUMENTS 3,552,096 A * 1/1971 Dayson ....................... 96/114
4,194,890 A * 3/1980 McCombs et al. ............ 95/23
4,349,357 A * 9/1982 Russell .......................... 95/26
4,516,424 A * 5/1985 Rowland .................. 73/31.02
4,877,429 A * 10/1989 Hunter .......................... 95/95
5,520,720 A * 5/1996 Lemcoff ........................ 95/96
5,529,607 A * 6/1996 Tan .............................. 95/12
5,578,115 A * 11/1996 Cole .......................... 96/121
5,997,617 A * 12/1999 Czabala et al. ................ 96/130
6,036,754 A * 3/2000 Rowe .......................... 96/130
6,068,680 A * 5/2000 Kulish et al. ................... 95/98
6,176,897 B1 * 1/2001 Keefer ........................... 95/98
6,302,107 B1 * 10/2001 Richey et al. .......... 128/205.18
2002/0033095 A1 * 3/2002 Warren .......................... 95/11
2002/0121191 A1 * 9/2002 Warren .......................... 95/11
2004/0107831 A1 * 6/2004 Graham et al. ................. 95/96

FOREIGN PATENT DOCUMENTS

JP 5-192526 A * 8/1993

* cited by examiner

*Primary Examiner*—Robert A Hopkins
(74) *Attorney, Agent, or Firm*—patenttm.us

(57) ABSTRACT

A rapid cycle pressure swing adsorption oxygen concentration method uses a mechanical valve that has at least one cam-actuated flow control valve to switch flow of fluid, such as compressed air coming into a sieve tank that is fitted with molecular sieve materials. The cam-actuated flow control valve is repeatedly actuated by the rotating cams to become open or closed to complete a cycle that precisely controls the flow direction, pressure conditions and pressurized timing in the sieve tank whereby performance and efficiency of producing rapidly oxygen is high.

4 Claims, 8 Drawing Sheets

103 101 113 112 111 136 136 132 133 136 136 134 136 102 131 135 102 11 137 20 22 21 23 137 137 231

RAPID CYCLE PRESSURE SWING ADSORPTION OXYGEN CONCENTRATION METHOD AND MECHANICAL VALVE FOR THE SAME

BACKGROUND OF THE INVENTION

1. Field of the Invention

The present invention relates to a rapid cycle pressure swing adsorption oxygen concentration method, and more particularly to an oxygen concentration method that uses a cam-actuated mechanical valve to control flow of gases, timing of pressurization and pressure conditions to improve efficiency of producing concentrated oxygen from air.

2. Description of Related Art

Oxygen concentrators have been considered a particularly cost effective and preferred apparatus to supply concentrated oxygen for supplemental oxygen therapy and for patients with respiratory disease at homes or hospitals. Over the last few years, the oxygen concentrators have been extended to provide the concentrated oxygen for beauty treatment, air conditioning machines and welding industries.

Pressure swing adsorption (PSA) is a process for separating gases from gas mixture, such as air. The pressure swing adsorption process is now well known as a very effective way to produce concentrated oxygen from the air. In a pressure swing adsorption process, the ambient air is pumped into a sieve tank that is typically fabricated of an airtight container filled with a molecular sieve material, such as Zeolite. For the separation of individual gases in the air, the pressure conditions in the sieve tank should be controlled precisely. However, in a conventional way to control the pressure conditions in the sieve tank, electromagnetic valves or other types of valves, such as rotatory valves have been widely used for fluid control of the air to switch the pressure conditions in the sieve tank.

However, when a pressure swing adsorption oxygen concentrator uses the electromagnetic valves to switch and control the airflow in the sieve tank, the flow rate and direction of the pumped air will be changed which causes noise as fluid is processed. Besides, the timing of pressurization cannot be controlled precisely that lowers efficiency of producing concentrated oxygen. For a high-end oxygen concentrator, high quality and performance are generally the focus and requirement of users. The conventional method that uses the electromagnetic valves to switch the pressure conditions for the pressure swing adsorption oxygen concentration will cause undesirable noise and low performance in the oxygen concentrator.

To overcome the shortcomings, the present invention provides a rapid cycle pressure swing adsorption oxygen concentration method that uses cam-actuated valves to control flow of fluid to mitigate or obviate the aforementioned problems.

SUMMARY OF THE INVENTION

The main objective of the invention is to provide a rapid cycle pressure swing adsorption oxygen concentration method to efficiently concentrate oxygen from the compressed air, and the method uses a mechanical valve having at least one cam-actuated valve to control airflow of the air.

Another objective of the present invention is to provide a mechanical valve for the pressure swing adsorption oxygen concentration method to improve oxygen concentration performance.

Other objectives, advantages and novel features of the invention will become more apparent from the following detailed description when taken in conjunction with the accompanying drawings.

DETAILED DESCRIPTION OF PREFERRED EMBODIMENT

Figure 1:
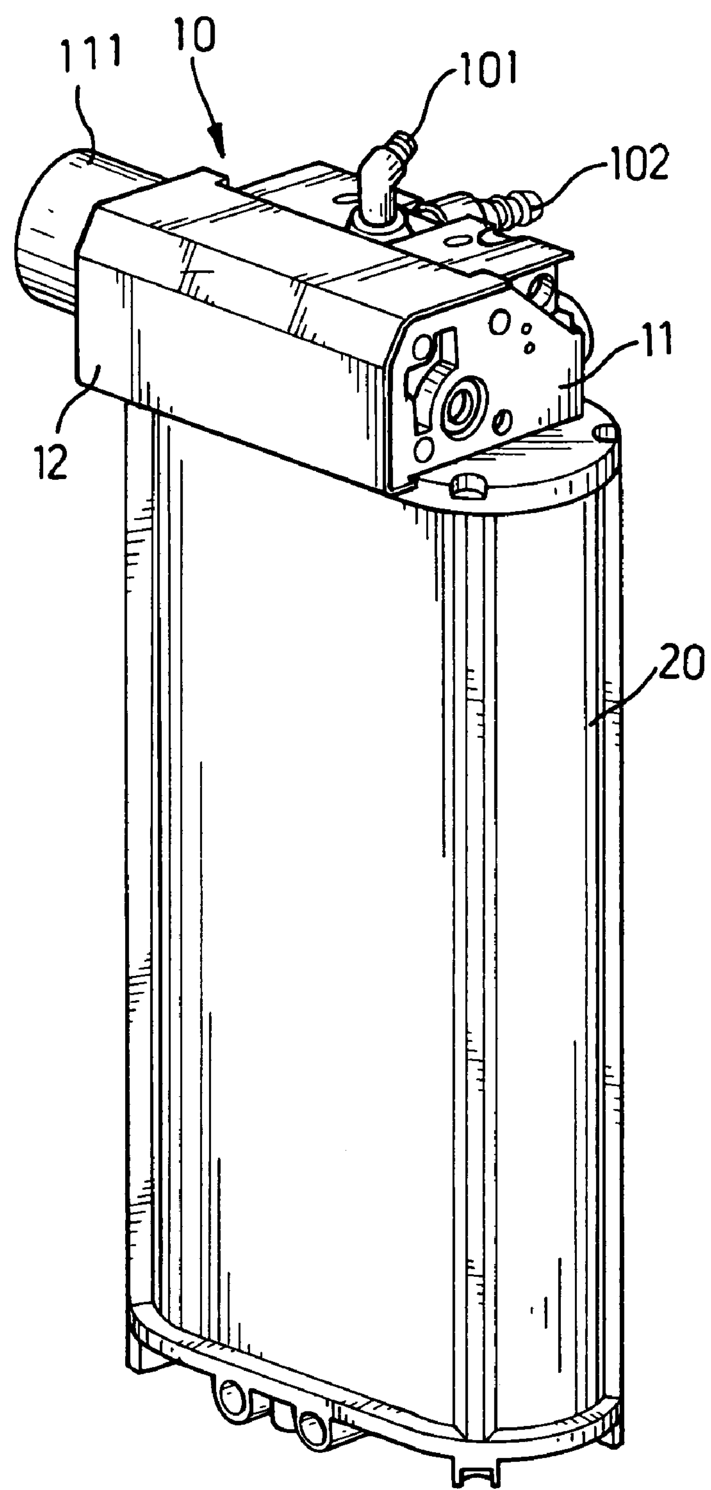
FIG. 1 is a perspective view of an oxygen concentrator having a mechanical valve in accordance with the present invention.

A rapid cycle pressure swing adsorption oxygen concentrator in accordance with the present invention uses a mechanical valve that has at least one cam-actuated flow control valve to switch flow of fluid, such as compressed air incoming into a sieve tank of the oxygen concentrator that is fitted with molecular sieve material. With reference to FIG. 1, a preferred embodiment of an oxygen concentrator (not numbered) that embodies the principles of the present invention is shown and illustrated. The oxygen concentrator comprises a mechanical valve (10) and a sieve tank (20).

Figure 3:
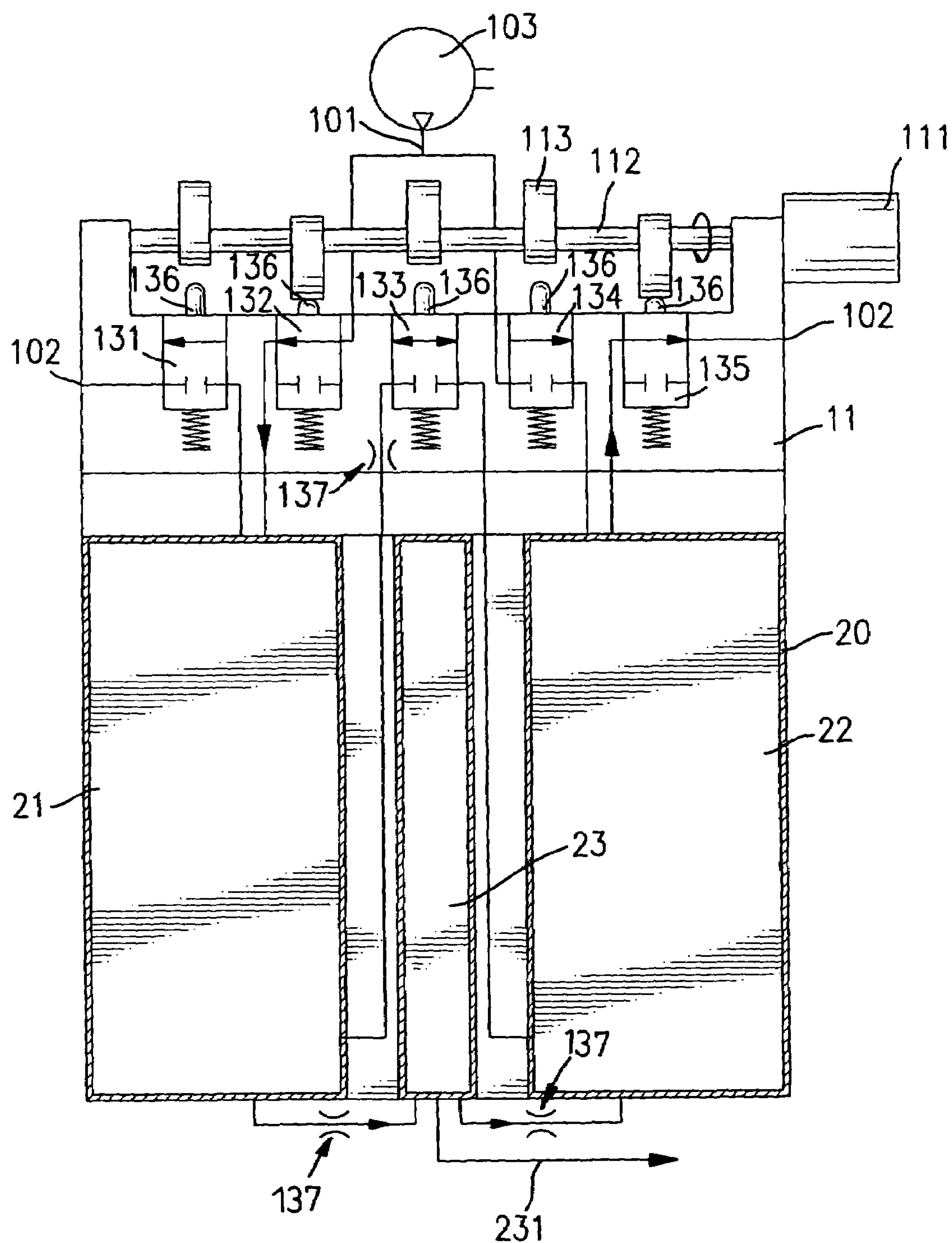
FIG. 3 is a schematic flow diagram of the oxygen concentrator, illustrating particularly a flow direction of fluid as multiple actuating cams of the mechanical valve are rotated at angle of 90° from an initial angular position.

With further reference to FIG. 3, the mechanical valve (10) is embodied to comprise a mounting bracket (11), a covering housing (12), a valve actuator (not shown), throttling valves (137) and five cam-actuated flow control valves including a first valve (131), a second valve (132), a third valve (133), a fourth valve (134) and a fifth valve (135) where the cam-actuated flow control valves and the throttling valves (137) are shown in schematic symbols. Each of the cam-actuated flow control valves can be a 2-position, 2-way air pilot directional control valve having respectively an actuating follower (136) that can be a roller to actuate the flow control valves to open as the followers (136) are pressed. In addition, numbers of the cam-actuated flow control valves in the disclosed embodiment can be modified, and types of the flow control valves can also be modified to embody the principles of the present invention. For example, if only one cam-actuated flow control valve is used, this flow control valve can be a different type of flow control valve that is different from the 2-position 2-way air pilot directional control valve. Such cam-actuated flow control valves are well known in this art, and there is no description provided further.

The mounting bracket (11) is mounted on the sieve tank (20) and has an inner space (not numbered), an intake air entrance (101) and an exhausting exit (102). The intake air entrance (101) is adapted to connect to a compressed air source (103), such as an air compressor (not shown) where the compressed air source (103) is shown in schematic symbol in the following drawings. The valve actuator is mounted on the mounting bracket (11) and is implemented with a motor (111), a rotating shaft (112) and five cams (113) corresponding to the cam-actuated flow control valves. The motor (111) can be a stepping motor (also called stepper motor) and is mounted on the mounting bracket (11). The rotating shaft (112) is mounted in the inner space of the mounting bracket (11), connects to the motor (111) and is rotated by the motor (111). The cams (113) are attached to the rotating shaft (112) and are rotated by the rotating shaft (112) to actuate precisely the corresponding cam-actuated flow control valves (131, 132, 133, 134, 135) in order according to a timing diagram illustrated in FIG. 2.

The sieve tank (20) is implemented with a first molecular sieve bed (21), a second molecular sieve bed (22) and an oxygen storage bed (23). The first and the second molecular sieve beds (21, 22) respectively communicate with the oxygen storage bed (23) by means of channels (not numbered). Both the first and the second molecular sieve beds (21, 22) are filled with molecular sieve materials (not shown). The oxygen storage bed (23) has a concentrated oxygen outlet tubing (231) so that the concentrated oxygen can flow out of the oxygen storage bed (23) to provide the oxygen for persons who need it.

In order to control the flow of the compressed air and the pressure conditions in the three beds (21, 22, 23), the cam-actuated flow control valves (131, 132, 133, 134, 135), the intake air entrance (101) and the exhausting exit (102) are respectively connected to the beds (21, 22, 23) and the compressed air source (103) by means of different channels (not numbered) in a manner as described below.

The intake air entrance (101) connects to the compressed air source (103) to permit the compressed air to enter either the first or the second molecular sieve beds (21, 22) of the sieve tank (20). The first valve (131) interconnects the first molecular sieve bed (21) with the exhausting exit (102) to control the flow of exhausting air out of the first molecular sieve bed (21). The second valve (132) interconnects the intake air entrance (101) with the first molecular sieve bed (21) to control the flow of incoming compressed air into the first molecular bed (21). The third valve (133) interconnects the first molecular sieve bed (21) with the second molecular sieve bed (22) to control the flow of air entering into one from another. The fourth valve (134) interconnects the intake air entrance (101) with the second molecular sieve bed (22) to control the flow of incoming compressed air entering into the second molecular sieve bed (22). Finally, the fifth valve (135) interconnects the second molecular sieve bed (22) with the exhausting exit (102) to control the flow of exhausting air out of the second molecular sieve bed (22).

Figure 2:
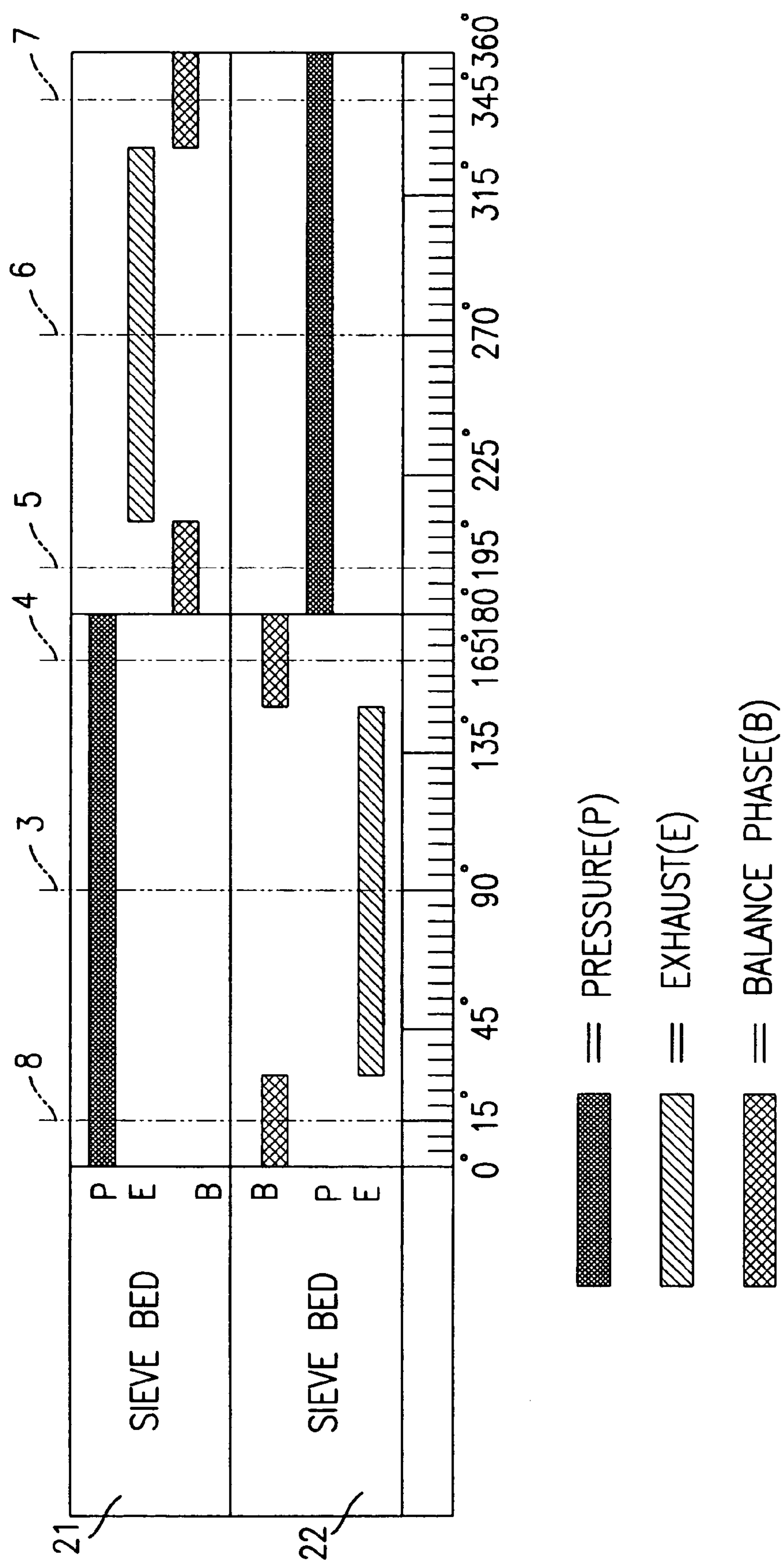
FIG. 2 is a timing diagram of the mechanical valve of the embodiment in FIG. 1, indicating the pressure conditions and timing.

With reference to FIGS. 2 and 3, the motor (111) starts to rotate the cams (113) at a constant speed whereby the cams (113) are rotated at angle of 90° from an initial angular position, and the pressure conditions in the molecular sieve beds (21, 22) and the oxygen storage bed (23) are changed and indicated by a line 3 shown in FIG. 2. At this moment, the actuating followers (136) of the second and the fifth valves (132, 135) are respectively actuated by the corresponding cams (113) to switch the two aforesaid valves (132, 135) to open. The compressed air comes into the first molecular sieve bed (21) via the intake air entrance (101) and through the opened second valve (132) to pressurize the first molecular sieve bed (21). Nitrogen of the incoming compressed air is trapped by the molecular sieve material in the first molecular sieve bed (21) while oxygen of the compressed air is allowed to flow through. The purified oxygen will eventually go into the oxygen storage bed (23) through the throttling valve (137) between the two beds (21, 23). The first molecular sieve bed (21) is now maintained in a so-called "adsorption phase" that separates the oxygen from the compressed air to produce an oxygen-rich product stored in the oxygen storage bed (23).

Meanwhile, the fifth valve (135) is also opened. The pressure in the second molecular sieve bed (22) will tend to be equalized with atmospheric pressure so that the molecular sieve material in the second molecular sieve bed (22) will release or purge the nitrogen that has been trapped during the previous step. Meanwhile, a small amount of purified oxygen in the oxygen storage bed (23) will come into the second molecular sieve bed (22) through the throttling valve (137) between the two beds (22, 23) to purge and vent the nitrogen to the atmosphere via the exhausting exit (102) because of pressure difference between the two beds (22, 23) and a flow limitation caused by the throttling valve (137). The remained purified oxygen in the oxygen storage bed (23) can be directed to the concentrated oxygen outlet tubing (231) to provide a person concentrated oxygen. At this situation, the second molecular sieve bed (22) is now maintained in a so-called "desorption phase" that the molecular sieve material is revived to have a capability of trapping the nitrogen from the air.

Figure 4:
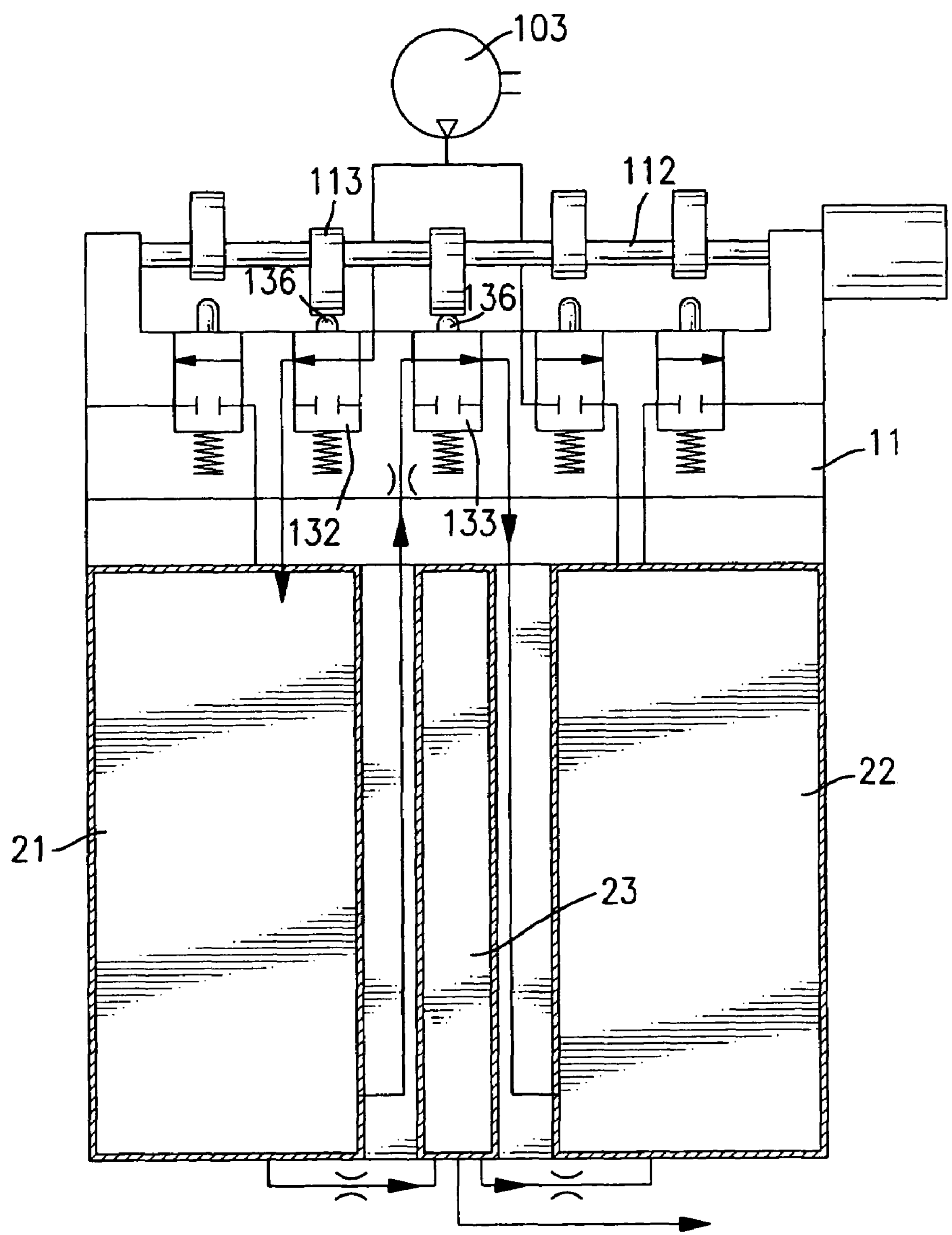
FIG. 4 is a schematic flow diagram of the oxygen concentrator, illustrating particularly a flow direction of fluid as the actuating cams of the mechanical valve are rotated at angle of 165° from the initial angular position.

With reference to FIGS. 2 and 4, in the next step, the cams (113) are now to be continuously rotated at an angle of 165° related to their initial positions, and the pressure conditions in the molecular sieve beds (21, 22) and the oxygen storage bed (23) are indicated by a line 4 shown in FIG. 2. The fifth valve (135) is closed now, and instead, the third valve (133) is opened. The compressed air flows continuously into the first molecular sieve bed (21) to produce rapidly the oxygen-rich product that is stored in the oxygen storage bed (23). Since the pressure in the first molecular sieve bed (21) is much higher than the pressure in the second molecular sieve bed (22), a small amount of the purified oxygen in the first molecular sieve bed (21) will simultaneously be directed into the second molecular sieve bed (22) to pressurize the same as the third valve (133) is opened. In this situation, the second molecular sieve bed (22) is maintained in a so-called "balance phase".

The balance phase for the second molecular sieve bed (22) will cause the second molecular sieve bed (22) to contain an optimized amount of oxygen and pressure energy before the second molecular sieve bed (22) enters the adsorption phase. Such a design can concentrate the separated oxygen to improve performance of producing oxygen for the oxygen concentrator.

Figure 5:
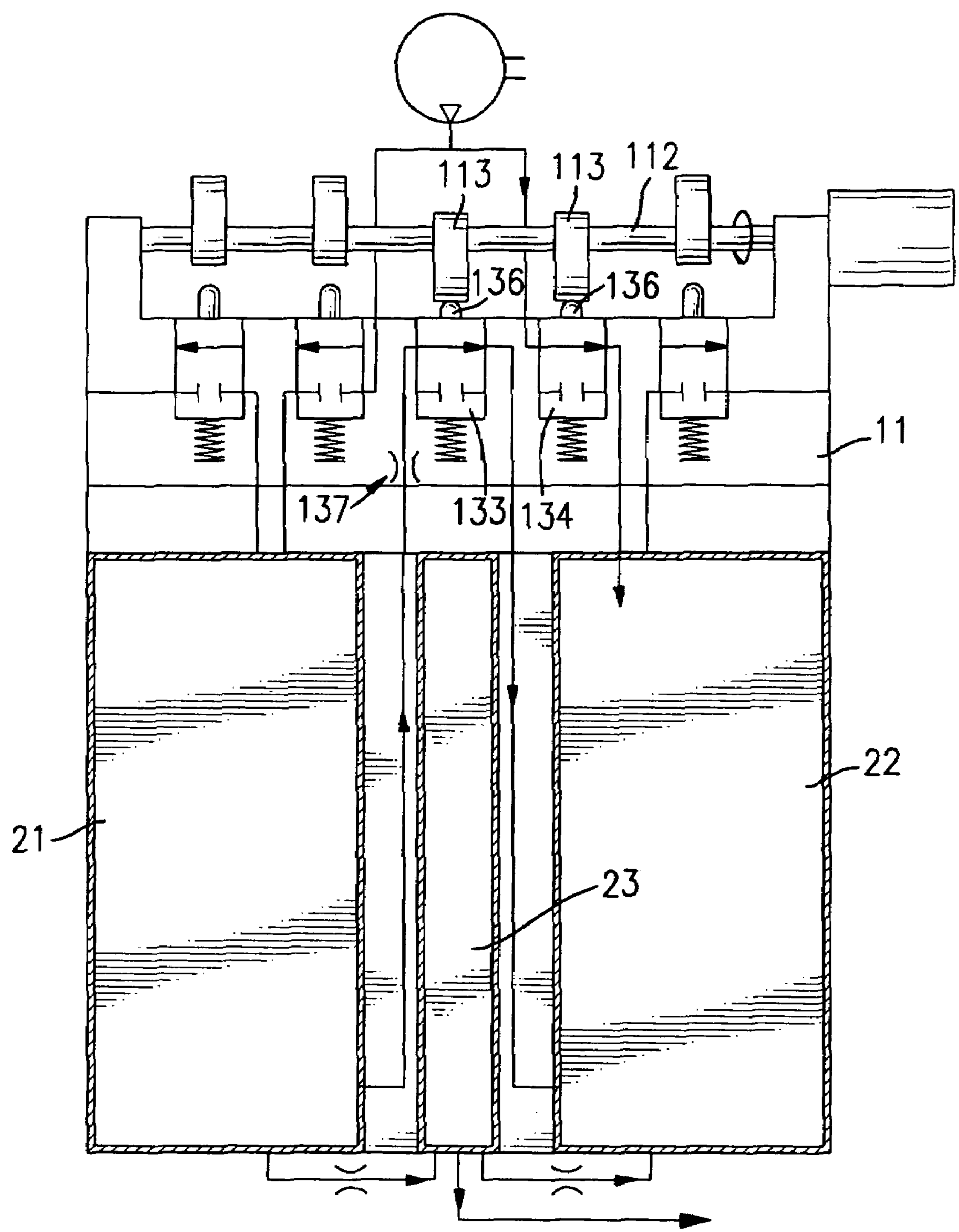
FIG. 5 is a schematic flow diagram of the oxygen concentrator, illustrating particularly a flow direction of fluid as the actuating cams of the mechanical valve are rotated at angle of 195° from the initial angular position.

With reference to FIGS. 2 and 5, the next step is to further rotate the cams (113) to an angle of 195° related to the initial positions, and the pressure conditions in the molecular sieve beds (21, 22) and the oxygen storage bed (23) are indicated by a line 5 shown in FIG. 2. The second valve (132) is now closed, and instead the fourth valve (134) is opened, but the third valve (133) is still open. At this moment, a small amount of the purified oxygen in the first molecular sieve bed (21), a small amount of the oxygen-rich product in the oxygen storage bed (23) and the compressed air caused by the compressed air source (103) come simultaneously into the second molecular sieve bed (22) to pressurize rapidly the same. Now, the pressurized second molecular sieve bed (22) is still in the aforesaid balance phase, but is approaching the end of this balance phase. The rapidly increased pressure in the second molecular sieve bed (22) will enhance efficiently the performance of producing the oxygen.

Figure 6:
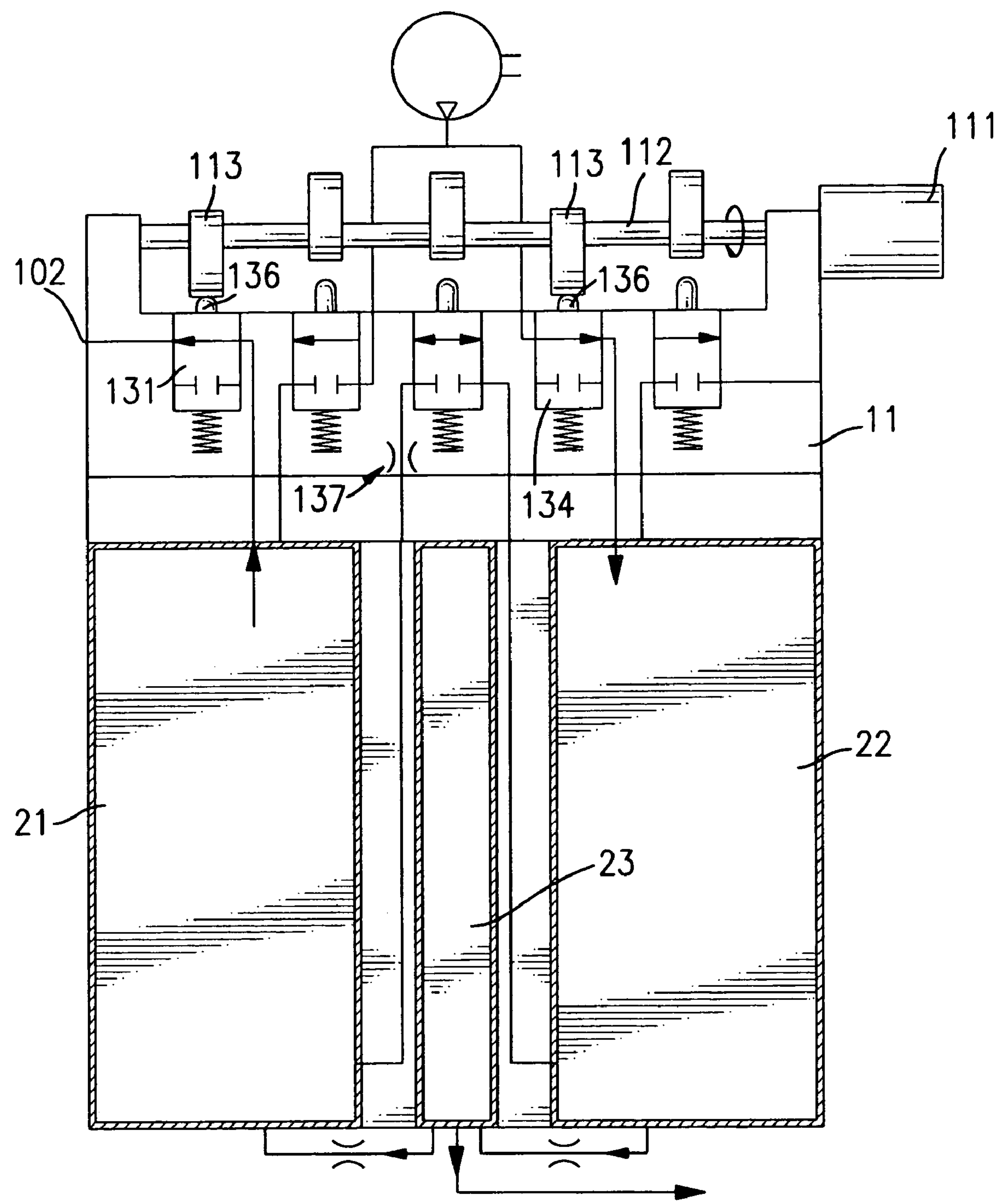
FIG. 6 is a schematic flow diagram of the oxygen concentrator, illustrating particularly a flow direction of fluid as the actuating cams of the mechanical valve are rotated at angle of 270° from the initial angular position.

With reference to FIGS. 2 and 6, the next step is to further rotate the cams (113) to an angle of 270° related to the initial positions, and the pressure conditions in the molecular sieve beds (21, 22) and the oxygen storage bed (23) are indicated by a line 6 shown in FIG. 2. Likewise, the third valve (133) is now closed, and instead the first valve (131) is opened to allow the first molecular sieve bed (21) to communicate with the atmosphere. The compressed air comes continuously into the second molecular sieve bed (22) that is going to become the adsorption phase. The nitrogen of the incoming compressed air is trapped by the molecular sieve material in the second molecular sieve bed (22) while the oxygen of the incoming compressed air is allowed to flow through as previously described.

Meanwhile, a small amount of the purified oxygen in the second molecular sieve bed (22) is directed into the oxygen storage bed (23) to become the oxygen-rich product. Since the first molecular sieve bed (21) is communicated with the atmosphere, the pressure in the first molecular sieve bed (21) is going to be equalized with the atmospheric pressure that means the first molecular sieve bed (21) is changed to the desorption phase. The trapped nitrogen will be released or desorbed by the molecular sieve material in the first molecular sieve bed (21) as the pressure is falling. Also, a small amount of the oxygen-rich product in the oxygen storage bed (23) is redirected into the first molecular sieve bed (21) to purge the first molecular sieve bed (21) because of the pressure difference. The released nitrogen is mixed with the oxygen-rich product, and the mixture is eventually exhausted into the atmosphere as previously described. Therefore, the molecular sieve material in the first molecular sieve bed (21) is revived to have a capability of trapping the nitrogen.

In effect, the pressure conditions of the first and the second molecular sieve beds (21, 22) shown in the FIGS. 3 and 6 are converse actions. The pressure conditions of the first molecular sieve bed (21) illustrated in FIG. 3 are initially maintained in the adsorption phase, but are switched to enter into the desorption phase illustrated in FIG. 6. Likewise, the pressure conditions of the second molecular sieve bed (22) illustrated in FIG. 3 are initially maintained in the desorption phase, but are switched to enter the adsorption phase illustrated in FIG. 6. The alternate changes of the pressure conditions between the two molecular sieve beds (21, 22) cause the oxygen concentrator to produce repeatedly the oxygen.

Figure 7:
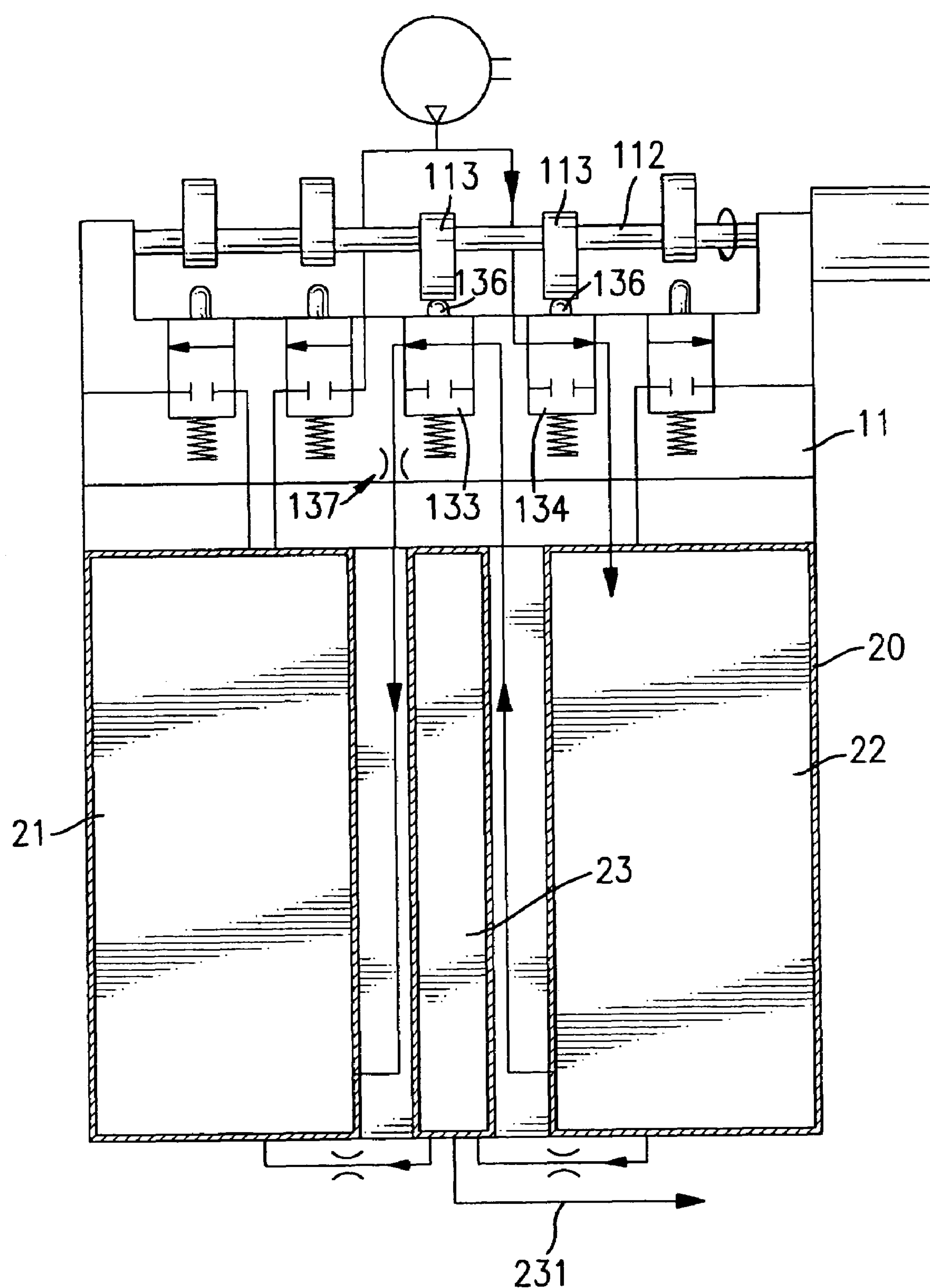
FIG. 7 is a schematic flow diagram of the oxygen concentrator, illustrating particularly a flow direction of fluid as the actuating cams of the mechanical valve are rotated at angle of 345° from the initial angular position.

With reference to FIGS. 2 and 7, the next step is to further rotate the cams (113) to an angle of 345° related to the initial positions, and the pressure conditions in the two molecular sieve beds (21, 22) and the oxygen storage bed (23) are indicated by a line 7 shown in FIG. 2. The third and the fourth valves (133, 134) are opened, and other cam-actuated valves are closed. However, the pressure conditions in the molecular sieve beds (21, 22) illustrated in FIG. 7 are just a converse action of the pressure conditions in the molecular sieve beds (21, 22) illustrated in FIG. 4.

Figure 8:
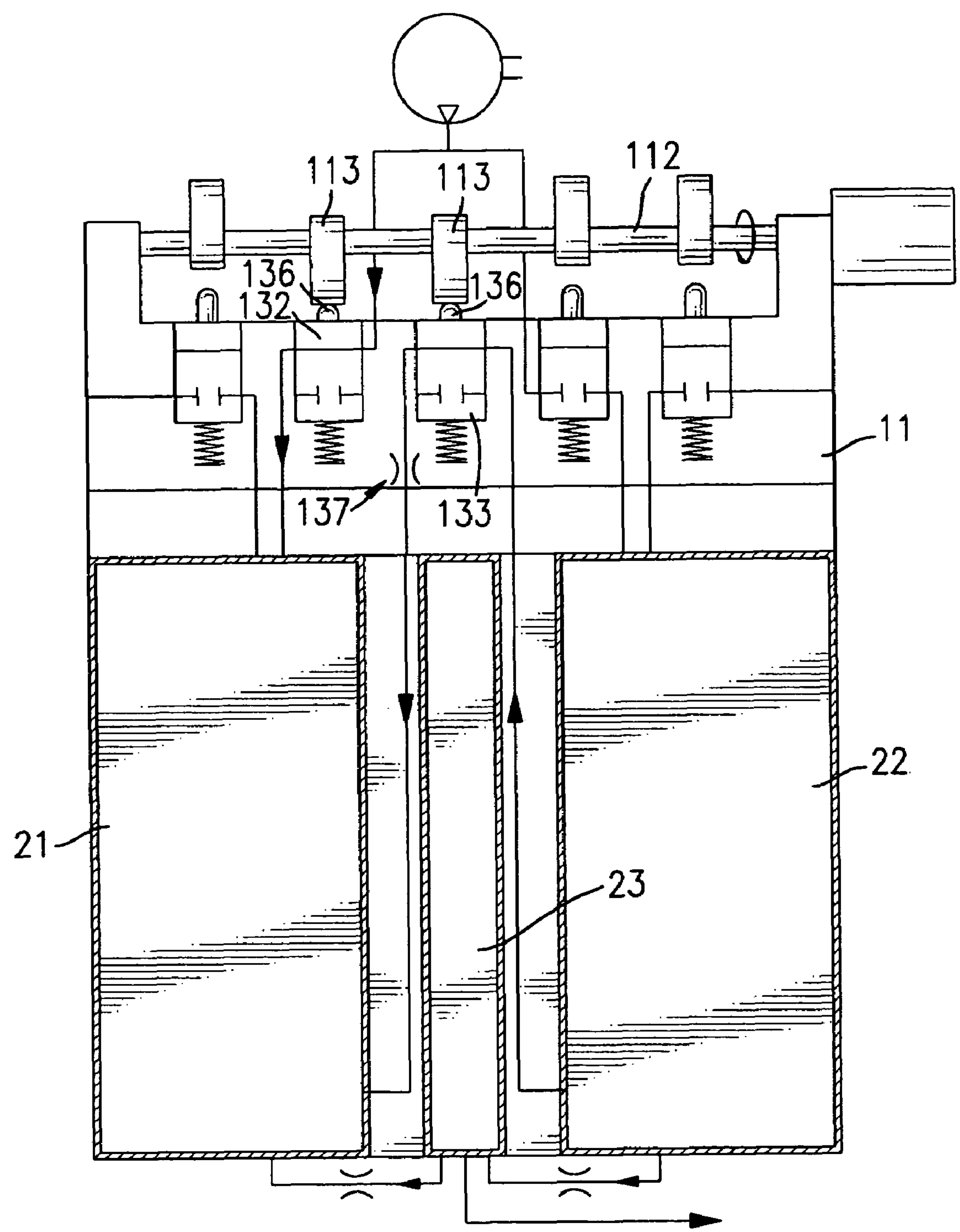
FIG. 8 is a schematic flow diagram of the oxygen concentrator, illustrating particularly a flow direction of fluid as the actuating cams of the mechanical valve are rotated at angle of 15° from the initial angular position.

With reference to FIGS. 2 and 8, the next step is to further rotate the cams (113) to complete a revolution and over an angle of 15° related to the initial positions, and the pressure conditions in the molecular sieve beds (21, 22) and the oxygen storage bed (23) are indicated by a line 8 shown in FIG. 2. The second and the third valves (132, 133) are opened, and other cam-actuated valves are closed. However, the pressure conditions in the molecular sieve beds (21, 22) illustrated in FIG. 8 are just a converse action of the pressure conditions in the molecular sieve beds (21, 22) illustrated in FIG. 5.

Since the cam-actuated flow control valves are actuated to be opened and closed, the timing of pressurization that introduces compressed air into the molecular sieve beds (21, 22) can be precisely controlled. Also, the pressure conditions of the three beds (21, 22, 23) can be switched timely. A smaller amount of the molecular sieve materials is required to produce the concentrated oxygen than in the prior art. With a smaller amount of the molecular sieve materials needed than the prior art, the oxygen concentrator can be fabricated with a compact size to reduce the manufacturing cost and weight of the oxygen concentrator. In addition, since the cam-actuated flow control valves change gradually their position to different ways, the noise generated is smaller so that the oxygen concentrator is quiet.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A rapid cycle pressure swing adsorption oxygen concentrator comprising a sieve tank having a first molecular sieve bed filled with molecular sieve materials;

a second molecular sieve bed filled with molecular sieve materials; and an oxygen storage bed communicating with both the first and the second molecular sieve beds and having a concentrated oxygen outlet tubing; and a mechanical valve mounted on the sieve tank and comprising a mounting bracket mounted on the sieve tank and having an inner space, an intake air entrance adapted to connect to a compressed air source and an exhausting exit;

a valve actuator mounted on the mounting bracket and comprising a motor mounted on the mounting bracket;

a rotating shaft mounted in the inner space of the mounting bracket and being rotated by the motor;

five cams mounted on the rotating shaft and rotated by the rotating shaft; and five cam-actuated valves mounted in the inner space of the mounting bracket, corresponding respectively to the five cams and comprising a first valve interconnecting the first molecular sieve bed with the exhausting exit, a second valve interconnecting the intake air entrance with the first molecular sieve bed, a third valve interconnecting the first molecular sieve bed with the second molecular sieve bed, a fourth valve interconnecting the intake air entrance with the second molecular sieve bed and a fifth valve interconnecting the second molecular sieve bed with the exhausting exit.

2. The rapid cycle pressure swing adsorption oxygen concentrator as claimed in claim 1, wherein the motor is a stepper motor.

3. The rapid cycle pressure swing adsorption oxygen concentrator as claimed in claim 2, wherein each of the cam-actuated flow control valves is a 2-position, 2-way air pilot directional control valve.

4. The rapid cycle pressure swing adsorption oxygen concentrator as claimed in claim 3, wherein the valve actuator further comprises a covering housing mounted on the mounting bracket to enclose the inner space.

* * * * *